K. SCHNETZLER.
DRIVING OF SINGLE PHASE MOTORS.
APPLICATION FILED FEB. 11, 1910.
1,046,500.
Patented Dec. 10, 1912.
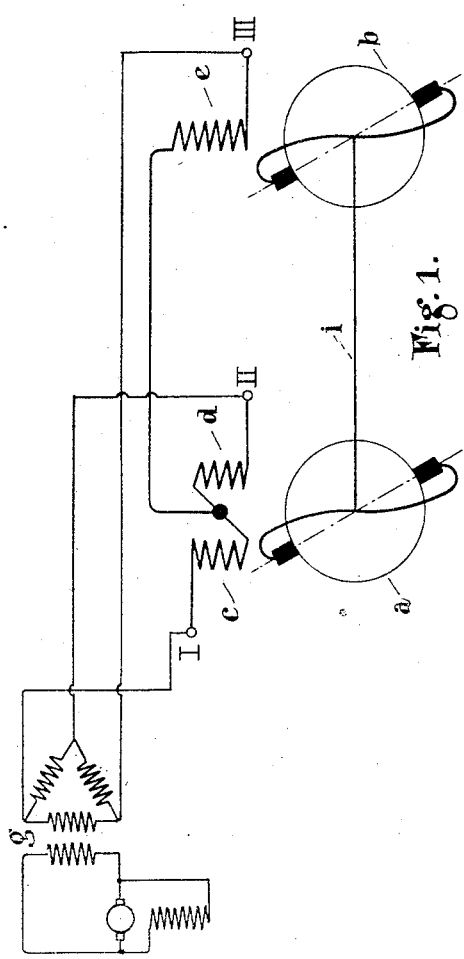
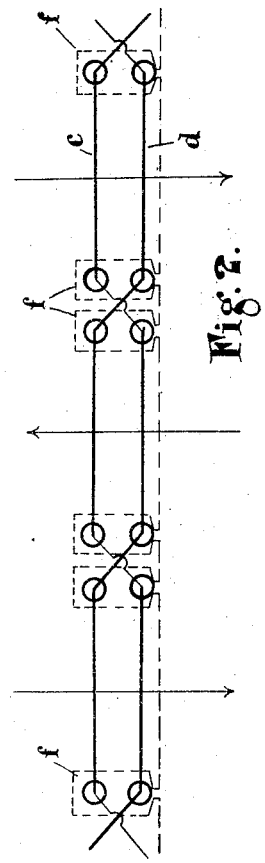
Attest:
Ewd L. Tolson.
Edward A. Barton
Inventor:
Karl Schnetzler
by Spear, Middleton, Donaldson & Spear
Attys.

UNITED STATES PATENT OFFICE.

KARL SCHNETZLER, OF BADEN, SWITZERLAND, ASSIGNOR TO ACTIENGESELLSCHAFT BROWN, BOVERI & CIE., OF BADEN, SWITZERLAND.

DRIVING OF SINGLE-PHASE MOTORS.

1,046,500.   Specification of Letters Patent.   Patented Dec. 10, 1912.

Application filed February 11, 1910. Serial No. 543,348.

*To all whom it may concern:*

Be it known that I, KARL SCHNETZLER, a subject of the Emperor of Germany, and residing at Burghaldenstrasse 951, Baden, Switzerland, have invented certain new and useful Improvements in and Relating to the Driving of Single-Phase Motors, of which the following is a specification.

The use of single-phase motors, which, since adjustable motors of this type and starting with a large torque have been at disposal, has become quite general, gives rise to certain difficulties if large units are to be connected up to three-phase alternating current networks or systems. 30 to 50 H. P. generally represents the utmost limit which large electricity works will allow as a single-phase connection. In order to make the connecting up of larger units possible, it has been proposed to convert the three-phase current into a two-phase current by means of a Scott transformer, and to connect each phase of the two-phase system with an alternating current motor. In such a case, two motors of equal size always belong together which motors are mechanically coupled.

The object of this invention is to effect an improved arrangement in which a special Scott transformer is not required.

The invention consists in an improved arrangement for driving single phase-motors from three-phase mains in which current from part of the phases serves to drive one motor and current from the other part of the phases to drive the other, the two motors being suitably connected mechanically.

The invention also consists in the improvements in and relating to the driving of single-phase motors from a three-phase system hereinafter described.

Figure 1 shows one manner of carrying the invention in to effect, and Fig. 2 shows a detail of a winding suitable for use according to the invention.

In carrying the invention into effect according to the form illustrated in Fig. 1, where by way of example two repulsion motors $a$ and $b$ are mounted on the same shaft $i$ the motor $a$ is driven from the two phases of the network $c$ and $d$ and the motor $b$ is driven from the remaining phase $e$. This gives a, Y or star connection, the terminals I, II or III being connected to the three-phase mains $f$ (to which is connected a three-phase generator conventionally represented and denoted by $g$), one end of winding $e$ leading to the neutral point. If the number of turns of the stator windings $c$ and $d$ of the motor $a$ be equal to W between the terminals I and II then the number of turns of the stator winding of the motor $b$ should be equal to $\tfrac{1}{2}\sqrt{3}\,W$ that is about 0.87 W.

It is important for efficient working that the windings $c$ and $d$ possess as much as possible equal resistance and have equal leakage. One method of obtaining this is shown in Fig. 2 in which the stator slots $f$ each contain a coil of the windings $c$ and $d$, but the arrangement is such that the coils of the various poles include an equal number of internal coils and external coils. In the form shown each pole has one external and one internal coil for each of the windings $c$ and $d$.

Having now described my invention, what I claim as new and desire to secure by Letters Patent is:—

1. In dynamo electric machinery in combination two single phase motors including stators and rotors, windings on said stators, alternating current three phase mains and electrical connections between two of said mains and the windings on one stator and between the other main and a terminal of a winding on the other stator, together with a further connection between the windings of the two stators; as set forth.

2. In dynamo electric machinery in combination two single phase rotors, a mechanical connection between said rotors, alternating current three phase mains, a winding disposed in proximity to one rotor, electrical connections from said winding to two of the mains, a winding disposed in proximity to the other rotor, electrical connections from one end of said winding to the third main and from the other end of said winding to said first winding; as set forth.

3. In dynamo electric machinery in combination two single phase motors including stators and rotors, a mechanical connection between said rotors, windings on said stators, alternating current three phase mains, electrical connections from the ends of the winding on one stator to two of said mains, an electrical connection from one end of the winding on the other stator to the third of said mains and a further electrical connection from the other end of this last said winding to an intermediate point in the first winding; as set forth.

4. In dynamo electric machinery in combination two single phase motors including stators and rotors, a mechanical connection between said rotors, windings on said stators, alternating current three phase mains, electrical connections from the ends of the winding on one stator to two of said mains, an electrical connection from one end of the winding on the other stator to the third of said mains and a further electrical connection from the other end of this last said winding to an intermediate point in the first winding, the winding on the second stator comprising 0.87 times the number of turns of the winding on the first stator; as set forth.

5. In dynamo electric machinery in combination two repulsion motors including stators and rotors, a source of alternating current three phase power, windings on the stators and electrical connections from one of said windings to two of the alternating current mains and from the other of said windings to the third main and to said first windings; as and for the purposes set forth.

In testimony whereof, I affix my signature in presence of two witnesses.

KARL SCHNETZLER.

Witnesses:
 CARL CUBLER,
 ARTHUR J. BUNDY.